(12) United States Patent
Cassassuce et al.

(10) Patent No.: US 8,137,538 B2
(45) Date of Patent: Mar. 20, 2012

(54) UV WATER PURIFICATION SPIGOT

(76) Inventors: Florence Cassassuce, La Paz (MX);
Dan Matthews, Gilbert, AZ (US)

( * ) Notice: Subject to any disclaimer, the term of this patent is extended or adjusted under 35 U.S.C. 154(b) by 190 days.

(21) Appl. No.: 12/717,758

(22) Filed: Mar. 4, 2010

(65) Prior Publication Data

US 2011/0215037 A1    Sep. 8, 2011

(51) Int. Cl.
*B01D 35/04* (2006.01)
*C02F 1/32* (2006.01)

(52) U.S. Cl. .................... 210/95; 210/110; 210/192

(58) Field of Classification Search ............ 210/748, 210/764, 192, 109, 110, 97, 95, 460–463, 210/449; 422/24, 186.3; 250/432 R, 435, 250/436

See application file for complete search history.

(56) References Cited

U.S. PATENT DOCUMENTS

| | | | |
|---|---|---|---|
| 2,338,387 A * | 1/1944 | Whitman | 250/436 |
| 4,280,912 A | 7/1981 | Berry | |
| 4,676,896 A * | 6/1987 | Norton | 210/192 |
| 5,445,729 A | 8/1995 | Monroe | |
| 5,780,860 A | 7/1998 | Gadgil | |
| 5,843,309 A | 12/1998 | Mancil | |
| 6,451,202 B1 | 9/2002 | Kuennen | |
| 6,468,420 B1 * | 10/2002 | Kunkel | 210/90 |
| 6,726,839 B2 | 4/2004 | Taylor | |
| 6,909,101 B2 | 6/2005 | Nishioka | |
| 7,361,904 B2 | 4/2008 | Cassassuce | |

* cited by examiner

*Primary Examiner* — Terry Cecil
(74) *Attorney, Agent, or Firm* — Parsons Behle & Latimer

(57) ABSTRACT

A compact point of use water purifier intended for both urban and rural areas of developing countries. The purifier is a spigot with an integrated UV radiation source 18 adjacent to an outlet orifice 19 to selectively on demand expose untreated water when the spigot valve 15 is activated to dispense water for consumption. The valve includes a user-activated handle 154 and is configured such that upon initial movement of the handle the ultraviolet radiation source is activated and upon continued movement of the handle the valve is opened. The water purifier is connectable to an electric power source, either 110V/220V AC or 12VDC, via a transformer unit to deliver the appropriate voltage to the spigot unit.

5 Claims, 2 Drawing Sheets

UV WATER PURIFICATION SPIGOT

FIELD OF INVENTION

This invention relates to water purification and more particularly to an apparatus for subjecting fluids to ultraviolet (UV) light. The apparatus may be used for water sterilization and is intended for point-of-use on demand application.

BACKGROUND OF THE INVENTION

In both urban and rural areas of developing countries, the main limitation for ensuring good quality drinking water to the population is the absence of what developed countries call "tap water".

Urban areas of developing countries do not have access to continuous flow of water in their potable distribution system; instead, urban households receive only a few hours of water per day, and not every day. As a result, buildings in urban areas are equipped with storage tanks that are filled whenever there is flow in the municipal water pipes. Those tanks can be roof tanks or underground cisterns. They range in volume between 200 and 1000 gallons storage capacity. Therefore, in developing countries, opening a faucet means receiving water from a tank where water has been stagnant for a few days, possibly silted and contaminated with bacterial growth.

Consequently, most urban households in developing countries do not drink water from their faucets, they use it solely for washing, bathing, and sometimes cooking. For drinking, urban families purchase "purified water", typically sold in 5 gallon jugs that cost around 1 dollar. The 5 gallon jugs are heavy and cumbersome and require some kind of dispenser for serving the water. Typical dispensers are either plastic or ceramic large-mouth containers, and 5-gal jugs are flipped 180 degrees on those containers so as to rest neck-down. The dispensers are equipped with a regular plastic spigot to conveniently serve water. From a study conducted in 2009 in a medium-size city of Mexico, namely La Paz, Baja Calif. Sur, it was determined that 95% of the 150 urban families interviewed were using 5-gal purified water jugs and dispensers in their households for drinking water. In the same study, water quality tests were conducted to measure concentration of bacteria, i.e. total coliform and fecal coliform bacteria, in both unopened 5-gal jugs and household dispensers. It was found that there was zero bacterial contamination in the 5-gal jug samples. However 26% of these spigoted dispensers had total coliform bacteria and 11% had fecal coliform bacteria in their drinking water. Dispensers therefore seem to promote recontamination of the water. Sources of recontamination include typical handling and transport of jugs. Purified water jugs are oftentimes delivered at the back of pick-up trucks, by a person carrying it on his shoulder to the house and placing it onto the spigoted dispenser. Dust and fumes during transport and unwashed hands while handling 5-gal jugs are therefore likely pathways for bacteria to reach the inside of the drinking water dispensers.

Having examined the water situation in urban areas of developing countries, it can easily be imagined how the problem is magnified in rural areas. There are no faucets and no water distribution infrastructure in most rural communities of the developing world. Water is carried from the wells or springs to the house in buckets or other containers. In the best scenario, there might be a hose or pipe conducting water by gravity from a spring or tank to communal faucets. In a study conducted in 2005 in Baja Calif. Sur with the National Water Commission of Mexico, samples of 500 water sources in rural communities and determined that 42% of them had fecal contamination. In the same study, samples were taken from 500 household water containers and found that 54% had fecal contamination. Household containers are indeed generally more contaminated than water sources in rural communities. Providing a "safe" water source is therefore not enough since rural families have no "tap water" and will continue to store water in unsafe containers. In another study of 30 existing water filters installed by aid agencies and non-profit organizations, it was found that 36% of water filters had total coliform bacterial contamination in the stored filtered water, one of the filters actually having had a higher bacterial concentration in the filtered water compared to the source water. This can be explained by lack of maintenance and cleaning of the filter, poor hygienic conditions in the households such as dirt floors and dusty homes, handling of filters with unwashed hands, and presence of animals in the households (for example, a chicken sitting on top of a bucket water purifier).

From the foregoing description of the water situation in developing countries it can be concluded that safe drinking water can only be provided at the point-of-use. But that is not enough, because point-of-use water filters, if they involve storage of the filtered water, can themselves become contaminated. Safe drinking water therefore requires not merely point-of-use purification, but actually no-storage instantaneous point-of-use purification. This is the main motivation beyond the here-presented invention.

Prior point-of-use water purification devices for developing countries typically involve storing filtered water within the device, such as the various types of ceramic pot filters and ceramic candle filters (Potters-For-Peace, Katadyn) which are prone to recontamination of the filtered water, especially if adequate maintenance is not provided to the filter after a few months of use. The germicidal chemicals used in ceramic filters, typically iodine or silver, are lost after a year of use, but users have no way to know when replacement of the ceramic element is necessary, they therefore continue using their device for many years. This leads to the filter being a source of contamination instead of a means of sterilization, as was observed during the aforementioned water sampling campaign, where filtered water had sometimes more bacteria than the source water.

Boiling is another typical means of sterilizing water, but the boiled pot of water left standing in the kitchen is used by family members throughout the day, and water is retrieved from the pot by dipping cups which leads to quick recontamination of the boiled water. A simple experiment was conducted in a rural household of Mexico to measure the recontamination time for boiled water: at 10 am, a pot of water was boiled and a sample was taken to ensure it had zero bacterial contamination; samples were then taken every 30 min, and it was observed that recontamination by bacteria occurred at the fourth sample, i.e. at 11:30 am. Only one hour and 30 minutes was necessary to recontaminate boiled water left standing in a kitchen in a typical rural household scenario.

Chlorine or iodine drops are another means of sterilizing water in developing countries. Chemical disinfection is difficult to implement at the household level, since rural families strongly reject the taste of those disinfectants described as unhealthy to ingest. Short shelf life of those disinfectants require frequent buying which is oftentimes impossible for isolated communities, who prefer to spend the few dollars of their monthly budget on food and other items.

Other devices have employed ultraviolet light to sterilize water for use in developing countries, such as the UV water purification system described in U.S. Pat. No. 7,361,904 and the UV water disinfector described in U.S. Pat. No. 5,780,860. The former presents a major problem observed during monitoring of 1,500 units installed in rural Mexico between 2006 and 2008. The disinfection chamber is prone to silting since fine sediments contained in water accumulate over time and grow to a thick "mud-type" layer. Water passing in the bottom chamber is therefore not sterilized properly by UV radiation source since bacteria can easily hide in between mud particles before reaching the outlet where the user obtains water. Observation of the use of the aforementioned UV water purification system led to the conclusion that a water sterilization device intended for developing countries cannot rely on maintenance performed by a user, since many users will not clean or maintain their water sterilization device, at least not as expected by the inventor of the device. The UV water disinfector described in U.S. Pat. No. 5,780,860 is another sterilization device intended for use in developing countries at the village scale. The major issue with village-scale sterilization devices is recontamination of the water during transport and storage. Villagers will walk a certain distance to the location of the sterilization system to obtain water, or will have someone deliver sterilized water to their homes. But if sterilized water is transported or stored in unclean containers, or if water is retrieved by dipping cups where hands can come in contact with sterilized water, there is a significant risk of recontamination within a few hours of obtaining sterilized water.

Other devices using ultraviolet light to sterilize water have been invented for use in modern homes of developed nations. The UV water purifying devices described in U.S. Pat. Nos. 6,909,101; 5,843,309; and 4,280,912 are faucet-type UV sterilizing systems. These devices are specifically manufactured for developed country household plumbing systems and would not be easily adapted to rural households in the developing world. These devices also have elongated conduits between the UV radiation source and the water outlet which can promote growth of bacteria between each use. Droplets of water remaining in the conduit between the UV sterilizing chamber and the water orifice can promote bacterial growth which would not be sterilized by subsequent uses of the device. Other UV sterilizing devices are counter-top water purification devices such as those described in U.S. Pat. Nos. 6,451,202; 6,726,839 and 5,445,729 involving multiple steps of filtering and sterilizing with a UV radiation source prior to dispensing at a spigot. Those units are complicated and costly, typically in the hundreds of dollars, and they are therefore neither affordable nor easily serviceable by families in developing countries. The counter-top units pose the same problem as the faucet-type ultraviolet systems described above, because they also possess an elongated conduit between the UV sterilization chamber and the water outlet which creates a potential recontamination hotspot that is not easily accessible for cleaning between each use.

The present invention is a simple, compact, affordable, maintenance-free and recontamination-free ultraviolet purification spigot that resolves many of the challenges observed in other water purification devices intended for developing countries. By placing the UV light immediately adjacent to the outlet orifice of the water, there is no recontamination risk along conduits or in storage units and the user is able to sterilize just the amount that is needed, be it a glass of water to drink or a pot of water to bath a child. The small size of the device is an essential characteristic of this invention which will greatly enhance its distribution potential in rural areas of developing nations as hardware stores in villages or county capitals will be able to carry this device in their inventory among other similar-sized items such as bulbs, batteries, and flashlights. This will eliminate the need for humanitarian-type distribution schemes by governments, aid agencies or non-profit organizations which are generally one-time campaigns that do not establish distribution channels for long-term supply of replacement parts. As a final note, the present invention provides a great opportunity for creating a national water solidarity campaign between urban and rural areas. Such a campaign can be conceived such that, for every UV spigot sold in urban markets, one UV spigot can be subsidized for a rural family.

SUMMARY OF THE INVENTION

It is an aspect of the present invention to be able to inactivate all viruses, bacteria and parasites from untreated water in minimal exposure time to UV radiation.

It is another aspect of the present invention to expose the untreated water to UV radiation at the point of delivery to preclude the build-up of viral, bacterial and parasitic contamination in the dispenser and such contaminants from entering the dispensed water.

It is yet another aspect of the present invention that a water purifier employing a UV radiation source inside a spigot to germicidally treat water in a chamber adjacent to outlet orifice is provided and is especially suited for point of use on demand supply of purified water in urban and rural areas of developing countries.

It is a feature of the present invention that the UV radiation is supplied adjacent to the point of delivery of the water from the dispenser.

It is another feature of the present invention that the treated water is dispensed through a spigot that houses the UV radiation source.

It is still another feature of the present invention that a control valve selectively controls the flow of untreated water from the inlet of the spigot attached to any suitable container to the ultraviolet treatment chamber and that the control valve activates a switch that supplies electricity to the UV radiation source so that the ultraviolet bulb outputs germicidal light only when the spigot is in use and water flows around it to the outlet orifice.

It is a further feature of the present invention that it can be connected to either 110 VAC, 220 VAC or 12 VDC power source by means of transformer and ballast circuitry to supply the adequate starting and running voltage to the UV bulb.

It is yet another feature of the present invention that the UV radiation source is a filament-type ultraviolet lamp which allows the lamp to illuminate immediately when electrical contact is made.

It is an advantage of the present invention that the dispensed water is purified in about a second exposure time to the UV radiation source.

It is another advantage of the present invention that contaminants in the reservoir or water delivery device are eliminated via the UV radiation prior to exiting the spigot at the point of use.

It is yet another advantage of the present invention that the circuitry can be housed at a location distant from the device, optimally in a wall adapter unit at the electrical outlet.

It is a further advantage of the present invention that the compact filament-type ultraviolet bulb employed in this device allows for a low starting and running voltage, respectively around 14V and 10V, which is a standard safe voltage for household appliances coming in contact with water such as coffee makers and blenders.

It is still another advantage of the present invention that it is low-cost, maintenance-free and will only require easy replacement of the complete spigot unit every few years when the ultraviolet bulb burns out as easily noticed by user thanks to a viewing window on spigot.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Figure 1:
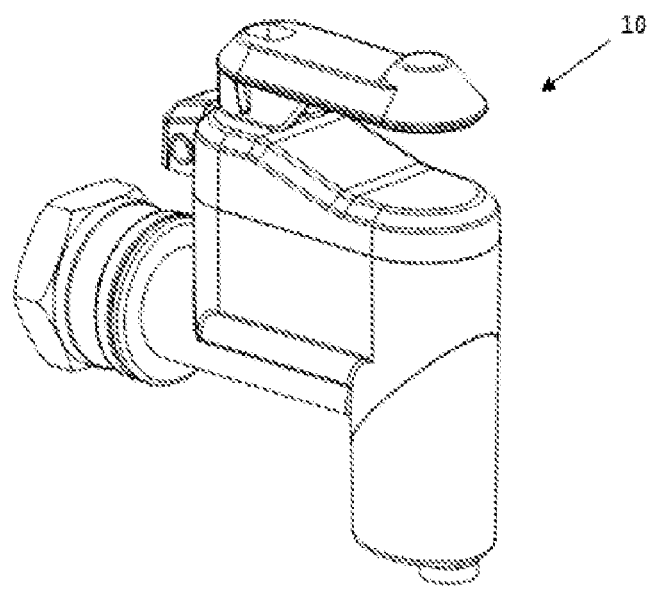
FIG. 1 is a general view of water purifying spigot unit.
Figure 2:
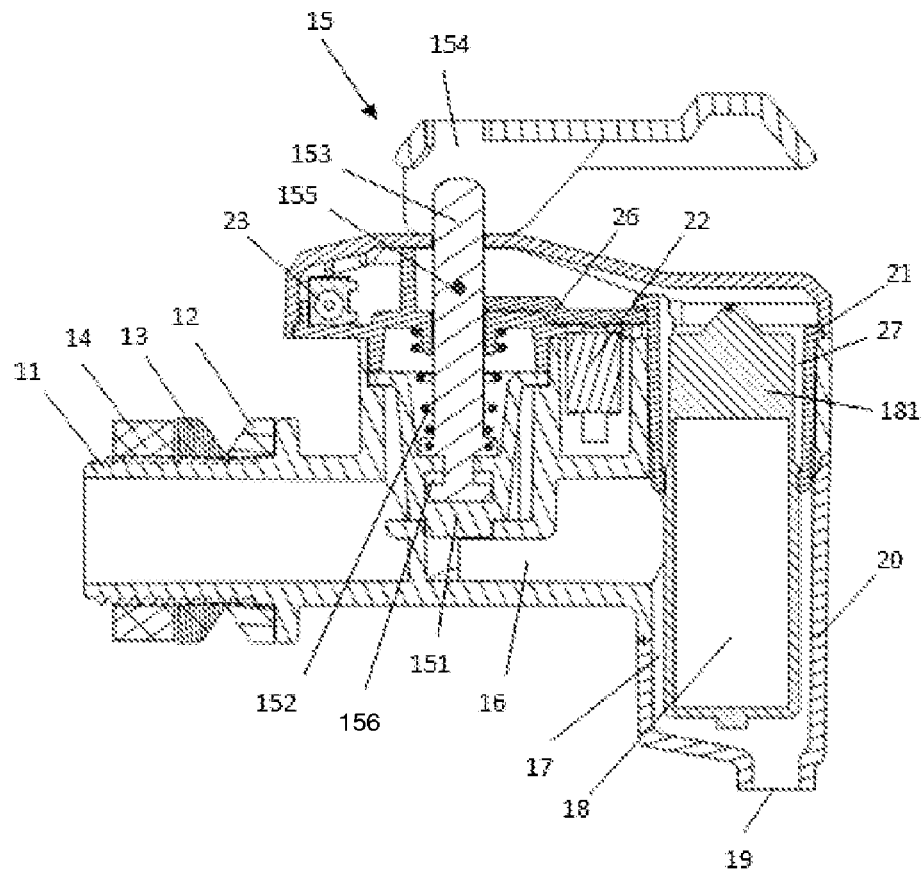
FIG. 2 is a cross-sectional view of the water purifier showing from left to right threaded attachment for spigot unit to be mounted on any suitable container, valve seal and valve mechanism and UV treatment chamber adjacent to outlet orifice for dispensing water.
Figure 3:
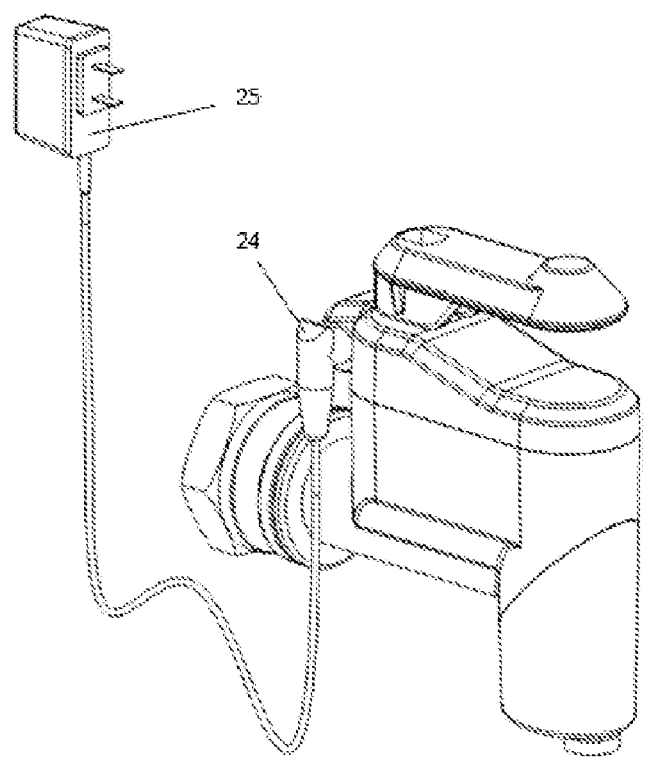
FIG. 3 is a general view of the water purification spigot unit when connected to power supply unit.

The UV water purification spigot, indicated generally by the numeral 10, as seen in FIG. 1 and more specifically in FIG. 2; consists of a threaded inlet conduit 11, a valve mechanism indicated generally by the numeral 15, a disinfection chamber 17 containing an ultraviolet bulb 18 and an orifice outlet 19 through which a user gets disinfected and germicidally treated water.

The threaded inlet conduit 11 is a ¾ inch outside diameter conduit designed to be attached to any suitable container (not shown), provided such container has a matching ¾ inch hole where threaded conduit 11 can be inserted and attached safely by using the two gaskets 12 and 13. Gasket 12 is designed to be placed on the outside wall of the container while gasket 13 is placed on the inside wall of the container. Threaded nut 14 pressures gaskets 12 and 13 to ensure spigot 10 is tightly held to container while gaskets 12 and 13 provide a secure seal to avoid water leaks from container. The untreated water flows in spigot 10 through conduit 11.

The flow of water is controlled by a valve mechanism indicated generally by numeral 15 comprising a conical rubber seal 151, a tapered spring 152 to exert pressure on conical rubber seal 151, a plunger 153 attached to a handle 154 that is activated by a user by either pushing or pulling on handle 154 to raise rubber seal 151 to let untreated water flow to entrance conduit 16. A gap 156 between plunger 153 and rubber seal 151 allows plunger 153 to raise 2 mm vertically to release pressure on lever 26 and unactivate button of microswitch 22 to turn on ultraviolet bulb 18 before engaging seal 151 which opens the flow of water to conduit 16. This built-in delayed valve opening mechanism ensures that lamp 18 is illuminated before water enters conduit 16 prior to reaching disinfection chamber 17. Prior designs allowed some water to pass out through the spigot before the lamp irradiated it. Afore-mentioned design now retains the water until the lamp is illuminated and the plunger is raised to engage the seal and release the water out through the spigot orifice.

Handle 154 can be pushed down or can be raised all the way to sit in a vertical position where it can rest without exerting pressure on it. Slight downward push on handle 154 when resting vertical returns it promptly to its horizontal position thanks to action of spring 152. Handle 154 is free to rotate horizontally around plunger 153 to any position within an approximate 180 degree radius limited by the wall of a container (both not shown) where spigot 10 is attached. When valve 15 is open, water flows to conduit 16 and enters disinfection chamber 17 where it is exposed to UV radiation emitted from germicidal bulb 18. The small diameter of disinfection chamber 17 forces untreated water to flow all around ultraviolet bulb 18 and guarantees full illumination and penetration of germicidal light into the untreated water. The distance between quartz wall of ultraviolet bulb 18 and the wall of disinfection chamber 17 is 1.5 mm. Water disinfected inside chamber 17 flows out through outlet orifice 19 where a user can obtain water by placing a cup or any container under orifice 19. Orifice 19 is a 6 mm diameter round hole.

A translucent cap 20 allows the user operating spigot 10 to visualize the ultraviolet light safely as ultraviolet rays are absorbed by plastic cap 20. Translucent cap 20 is therefore a viewing window for a user to visualize disinfection of untreated water and also detect the end of life of spigot 10 when ultraviolet bulb 18 no longer illuminates. Ultraviolet bulb 18 is held in housing 21 and epoxy is poured in gap 27 between ultraviolet lamp base 181 and housing 21 to prevent water from flowing upward when it reaches the disinfection chamber 17. Lamp base 181 has a positive and a negative pole to which electric connections are made. Electric connections run from lamp base 181 to microswitch 22 and to connector jack 23 which receives the matching connector plug 24 from the transformer ballast unit 25 at a remote location from spigot 10, preferably at the wall plug. Microswitch 22 is a normally closed switch which is activated by lever 26. When valve 15 is closed, plunger 153 is in its down position and pin 155 attached to plunger 153 pushes on lever 26 to maintain microswitch 22 in its activated position, which corresponds to its OPEN position. When user pushes or pulls on handle 154, plunger 153 raises and pin 155 no longer exerts pressure on lever 26 which releases microswitch 22 to its unactivated position, corresponding to its CLOSED position, which allows current to flow to ultraviolet bulb 18.

A suitable material for spigot 10 is ABS (acrylonitrile butadiene styrene) plastic or any suitable food-grade plastic approved by the Food and Drug Administration, preferably a plastic that does not contain BPA (Bisphenol A) chemicals that are currently facing possible ban in United States and Europe. Translucent cap 20 can be made of transparent or slightly colored translucent ABS provided the plastic composition contains a suitable FDA approved UV stabilizer such as TINUVIN or other adequate UV stabilizers to prevent degradation of cap 20 during usage of the spigot 10. Use of spigot 10 is estimated to take about 15 seconds per use to fill a glass of water and to be used between 20 and 30 times a day. The type of use of the spigot 10, i.e. for short lapses of time, but repeatedly throughout the day, will limit the degradation of plastic which usually happens during prolonged exposure to ultraviolet light.

Gaskets 12 and 13 are preferably made of flexible elastomer-type material of conical shape to provide maximum leak prevention. Seal 151 is a conical seal of any suitable flexible plastic material. Spring 152 is a tapered spring of 8.7 mm lower outside diameter, 12.7 mm upper diameter, 22.3 mm free length available commercially at Century Springs Corporation of Los Angeles, Calif. Plunger 153 is made preferably of a high resistance plastic such as reinforced acrylic or other strong and durable plastic to withstand the pulling and pushing action numerous times a day.

Microswitch 22 is a sealed pin plunger type subminiature switch rated at 125 VAC and 6 A current, or 30 VDC and 3 A, with solder terminals, available commercially from Future Electronics of Pointe-Claire, Montreal, Canada.

Germicidal bulb 18 is a filament-type, hot cathode, low pressure mercury vapor ultraviolet lamp that produces ultraviolet wavelengths around 254 nm that are lethal to pathogens such as bacteria, viruses and parasites that can be harmful to human health. As the UV radiation source, bulb 18 is available commercially from CNLight Co., Ltd of Fo Shan, China. Bulb 18 is rated at 3 W power with GTL2 standard base type, and is 17 mm in diameter, 52 mm in length where the quartz section of the bulb is 32 mm and the metal base of bulb is 20 mm. Ultraviolet bulb 18 requires a starting voltage of 12 to 14V and runs at a voltage of 10V and 0.3 A.

The transformer ballast unit 25 has two versions, a 110V/220VAC version for use in urban areas with regular 110V AC or 220 VAC power outlet, and a 12 VDC version for use in rural areas or during disaster-relief operations where 12 VDC batteries or a 12 VDC power source are oftentimes the only power sources available. Spigot 10 has such a low power requirement that it makes it especially suitable for being powered in any remote location from a small, postcard-size, solar panel.

Connector jack 23 and matching connector plug 24 are 1.3 mm center pin, 3.5 mm outside diameter, 7.4 mm length DC jack and plug available commercially from Shogyo International Corp. of Syosset, N.Y. Transformer ballast unit 25 for either 110V/220 VAC or 12 VDC applications is commercially available from Advanced Power Solutions Inc. in Pleasanton, Calif. Spigot 10 including spigot body, cap, housing, handle, seals, gaskets, plunger, pin and lever is commercially available in plastic injection from High Performance Engineering in Colorado Springs, Colo.

In operation, a user first attaches spigot 10 to a suitable container where untreated water will be added. Containers such as buckets, 5-gal jug water dispensers, and ceramic pots are all suitable. A user then connects transformer unit 25 to an appropriate power source. The user also connects connector plug 24 to jack 23 of spigot 10. Spigot 10 is then ready to dispense disinfected and germicidally treated water at outlet 19 whenever the user activates handle 154 to turn on ultraviolet bulb 18 and open flow valve 15. When the user is done serving water, the user can stop the flow of water and turn off bulb 18 by simply returning handle 154 to its resting horizontal position.

The UV water purification spigot 10 has been tested at FDA certified laboratory CIAD (Centro de Investigación en Alimentos y Desarrollo) in Culiacan, Sinaloa, MEXICO and found to supply 2.5 liters per minute of germicidally treated water after a less-than-a-second radiation period, effectively removing 99.9% of bacteria and viruses from the untreated water. The water purifier is thus able to inactivate all viruses, bacteria and parasites from untreated water in less-than-a-second exposure time to, or illumination by, UV radiation.

While the invention has been described above with references to specific embodiments thereof, it is apparent that many changes, modifications and variations in the materials, arrangements of parts and steps can be made without departing from the inventive concept disclosed herein. For example, any suitable FDA approved plastic material can be used to make the injection molded parts of spigot 10 such as polyethylene, polypropylene, PET or polyester, among others. Valve 15 could be a different flow control mechanism, such as a ball valve or diaphragm valve mechanism. Microswitch 22 could also be chosen from different miniature switch mechanism, such as a reed switch or mercury switch provided they are normally closed switches. Ultraviolet bulb 18 can be any 3 W ultraviolet bulb of GTL2 or GTL3 base type, either cold cathode or hot cathode, provided the dimensions of the bulb are small enough to fit in a spigot unit designed to be comparable in size to existing plastic spigots. Threaded inlet conduit 11 can be ¾ inch or ½ inch outside diameter thread or any other thread size most commonly used in container and dispenser applications in the specific country where spigot 10 will be made available. Connector jack 23 and plug 24 can be of other common dimensions for the center pin, outside diameter and length of plug provided the size of jack 23 remains small enough to be conveniently incorporated in spigot 10. Cap 20 could be of a pigmented translucent color such as translucent dark blue color to retain the ability of the user to view ultraviolet light safely, while dampening the intensity of light slightly. Outlet orifice 19 could be of any suitable shape for dispensing water, such as a rectangular or square slot provided it allows a user to conveniently obtain water in a common-size glass, cup, jar or any other water holding receptacles.

Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A point of use water purification spigot connectable to a water source having an ultraviolet radiation source to supply purified water having in combination:
   a. an ultraviolet (UV) radiation source;
   b. a flow control valve connected to the ultraviolet radiation source with a self-delayed valve opening mechanism to turn on the radiation source prior to permitting water to flow therethrough, the valve including a user-activated handle and configured such that upon initial movement of the handle the ultraviolet radiation source is activated and upon continued movement of the handle the valve is opened;
   c. a disinfection chamber connected to the flow control valve to receive water where the ultraviolet radiation source illuminates and disinfects the water;
   d. an outlet orifice adjacent the disinfection chamber, the UV radiation source being mounted vertically therein; and
   e. an energy source to provide energy for starting and running the UV radiation source.

2. The water purification spigot according to claim 1 further comprising the radiation source being a filament type mercury vapor lamp.

3. The water purification spigot according to claim 2 further comprising the energy source being a transformer ballast unit to regulate energy to the UV radiation source.

4. The water purification spigot according to claim 1 further comprising the flow control valve having a vertically movable plunger in selective sealing relationship with the disinfection chamber between a water source and an outlet orifice, the plunger having a delayed seal engagement mechanism for holding water until the radiation source is illuminated and the sealing relationship is broken.

5. The water purification spigot according to claim 1 further comprising a viewing window in the disinfection chamber to permit viewing the illumination of the UV radiation source in a turned on state.

* * * * *